US010099955B2

(12) United States Patent
Buchak et al.

(10) Patent No.: US 10,099,955 B2
(45) Date of Patent: Oct. 16, 2018

(54) METHOD AND APPARATUS FOR FABRICATING MICROSTRUCTURED OPTICAL FIBERS

(71) Applicant: Imperial Innovations Limited, London (GB)

(72) Inventors: Peter Buchak, London (GB); Darren Crowdy, London (GB); Yvonne Marie Stokes, Parkside (AU); Michael James Chen, Adelaide (AU); Heike Ebendorff-Heidepriem, Dover Gardens (AU)

( * ) Notice: Subject to any disclaimer, the term of this patent is extended or adjusted under 35 U.S.C. 154(b) by 557 days.

(21) Appl. No.: 14/731,562

(22) Filed: Jun. 5, 2015

(65) Prior Publication Data

US 2016/0357174 A1    Dec. 8, 2016

(51) Int. Cl.

| | | |
|---|---|---|
| *G05B 19/4097* | (2006.01) | |
| *G06F 17/10* | (2006.01) | |
| *C03B 37/027* | (2006.01) | |
| *B29D 11/00* | (2006.01) | |
| *C03B 37/025* | (2006.01) | |

(52) U.S. Cl.
CPC .. *C03B 37/02781* (2013.01); *B29D 11/00663* (2013.01); *C03B 37/0253* (2013.01); *C03B 2203/42* (2013.01); *C03B 2205/40* (2013.01); *C03B 2205/44* (2013.01)

(58) Field of Classification Search
CPC .......... C03B 37/02781; C03B 37/0253; C03B 2203/42; C03B 2205/40; C03B 2205/44
See application file for complete search history.

(56) References Cited

PUBLICATIONS

Rosalind Wynne, A Fabrication Process for Microstructured Optical Fibers, Nov. 2006, Journal of Lightwave Technology, vol. 24, No. 11, pp. 4304-4313. (Year: 2006).*

* cited by examiner

*Primary Examiner* — Queenie S Dehghan
(74) *Attorney, Agent, or Firm* — Leveque IP Law, P.C.

(57) ABSTRACT

Prior to fabrication of an optical fiber with desired optical properties, a preform geometry is determined dependent upon a fiber geometry that possesses the desired optical properties. The desired geometry may contain a large number of channels. The processor determines the preform geometry by tracking backwards in time the parameters of a set of conformal mappings that describe the cross section of the fiber. Some of the drawing process parameters may be specified, while other parameters may be determined along with the preform geometry. The determined preform geometry may be used to fabricate the required preform. Using this preform, the determined drawing process parameters may be used to draw the desired fiber.

6 Claims, 10 Drawing Sheets

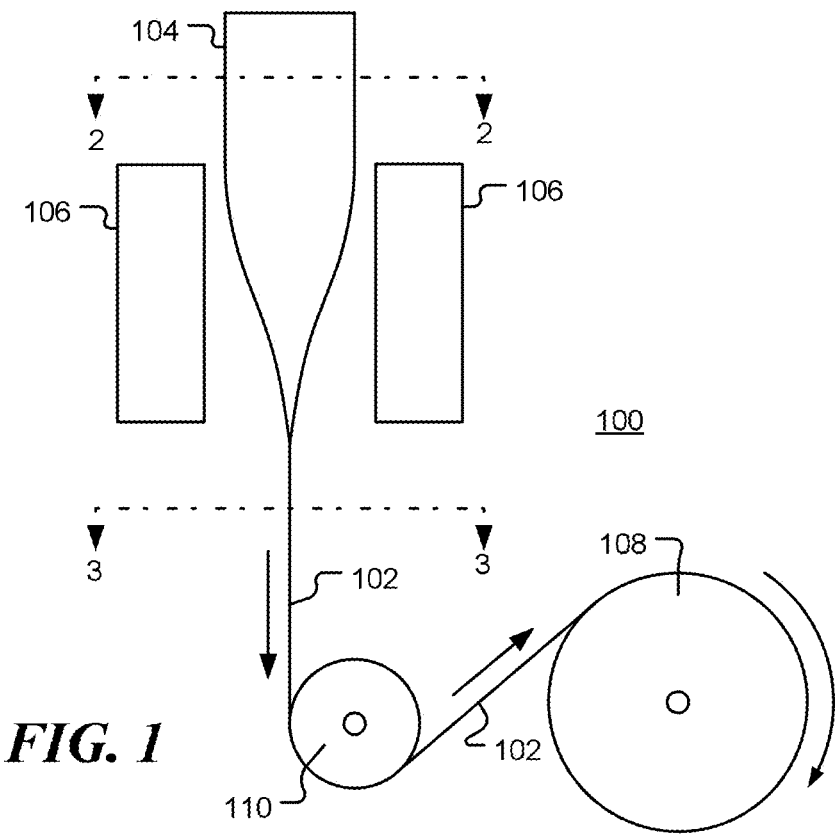
FIG. 1
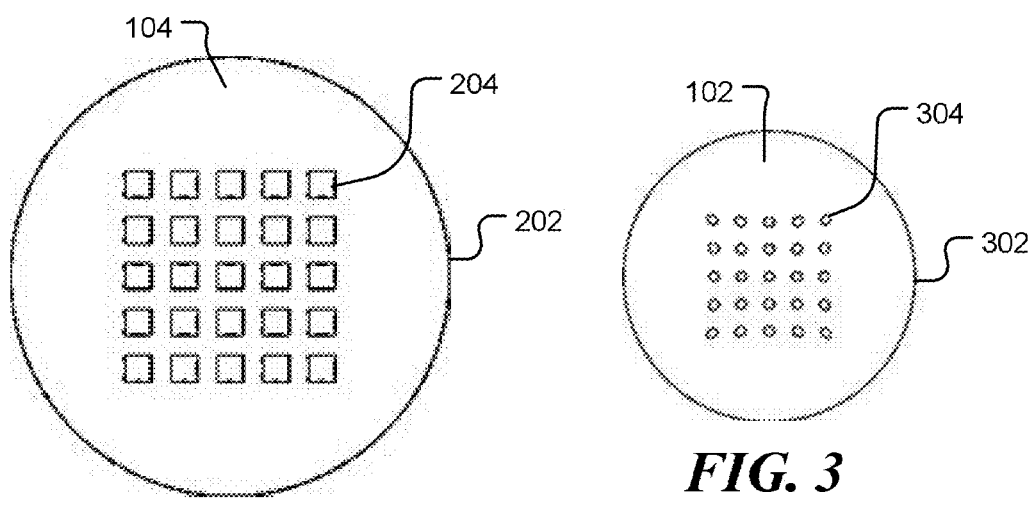
FIG. 2
FIG. 3

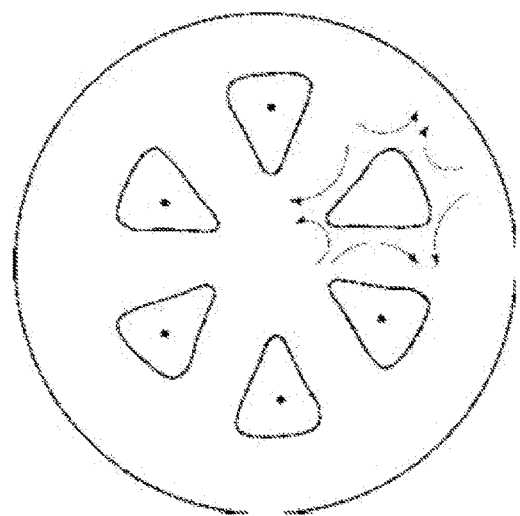
FIG. 7
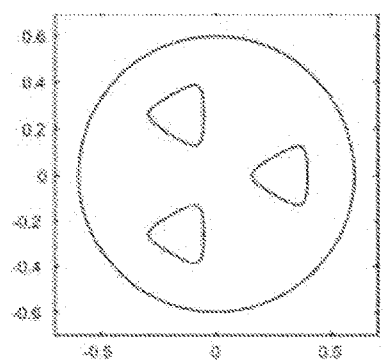 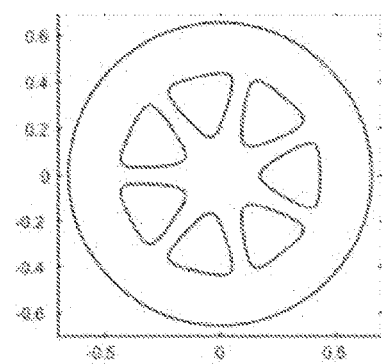
FIG. 8A  FIG. 8B

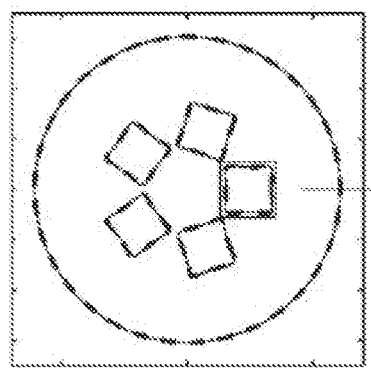
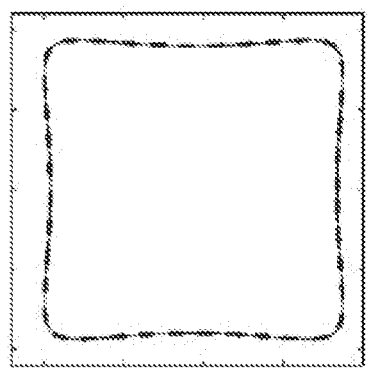
FIG. 10A  FIG. 10B
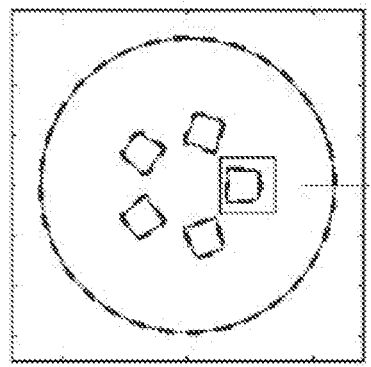
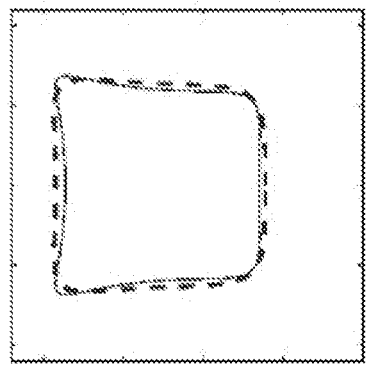
FIG. 10C  FIG. 10D

METHOD AND APPARATUS FOR FABRICATING MICROSTRUCTURED OPTICAL FIBERS

FIELD

The present disclosure relates to microstructured optical fiber ("MOF") fabrication. The disclosure includes, but is not limited to, an improved method for the fabrication of MOFs by automatically determining an initial geometry for a preform used in the fabrication of a MOF and determining fiber draw parameters.

BACKGROUND

The fabrication of a microstructured optical fiber, or MOF, typically involves the drawing down of a preform comprising a cylinder of glass or polymer 1-3 centimeters in diameter containing a pattern of axial channels running through its length, usually 10-30 centimeters.

The preform is held at one end in a movable clamp at the top of a draw tower and pushed downwards at a specified feed speed through a heated zone in which the glass is heated and softens so that the heated preform can be pulled from below at a draw speed significantly larger than the feed speed. The ratio of the draw speed to the feed speed is known as the draw ratio. Both the draw ratio and the temperature are important control parameters in the draw process. The draw ratio determines the reduction in the area of the cross-section as it travels along the "neck-down length" of several centimeters (typically of the same order as the heated zone length).

To obtain a fiber having a typical diameter of 100-200 micrometers from a preform with a diameter of a centimeter, the draw ratio will typically be in excess of 4000. The temperature determines the material viscosity and, in turn, the fiber tension, which must be within an appropriate range—too small and its diameter will be difficult to control; too large and the fiber will break. At the base of the draw tower the (now cool) fiber is wound around a rotating drum so that it can be conveniently stored for future use. The draw process through the neck-down length is depicted in FIG. 1.

For microstructured optical fibers of interest in applications, there is a large variation in the number of channels, from just a few to perhaps 100 or more. The number of channels is not necessarily large, thereby rendering the proposition of a mean-field model of the cross-plane structure unlikely to be useful in practice. Moreover, it is often the unwanted deformations of specific channels in the cross-plane geometry that leads to compromised optical properties of the fiber.

Models that account for the different shape evolutions of all the individual channels are therefore highly desirable.

Previous approaches have involved direct numerical simulations of fiber draws. However, it is desirable to avoid the computational cost and necessity of full numerical simulation. Also, direct numerical simulations of fiber draws are of little practical use in the solution of the "inverse problem" where it is required to determine the initial geometry of preform configuration (such as the size and shape of the outer boundary and the size, shape and position of preform holes) and the set of manufacturing draw parameters (such as draw ratio, draw tension, and pressure, for example) that will, at the end of the draw, lead to the desired end-state geometry for the fiber.

With a view to finding a fast and accurate model of the forward problem, and providing a regularization mechanism for the challenging inverse problem, the inventors proposed a reduced model, called the generalized "elliptical pore model", or EPM, to facilitate fast and accurate simulations of the shapes of multi-channel microstructured optical fibers during the fabrication draw process as described in the paper by P. Buchak, D. G. Crowdy, Y. M. Stokes & H. Ebendorff-Heidepriem, J. Fluid Mech., (2015); incorporated herein by reference. To provide a complete description of the fiber drawing process and to calculate relevant draw parameters, this model was coupled to a description of the axial flow.

The EPM was originally proposed in a different context to the MOF application described here, in a paper by D. G. Crowdy, "An elliptical-pore model of late-stage planar viscous sintering", J. Fluid Mech., 501, 251-277, (2004). In this paper, the EPM was used to approximate the evolution of a doubly periodic square (four pores) and hexagonal (six pores) arrays of pores shrinking under the effects of surface tension and it was found to give excellent agreement with full boundary integral simulations of that problem performed by C. Pozrikidis, in "Expansion of a compressible gas bubble in Stokes flow", J. Fluid Mech., 442, 171-189, (2001) and Pozrikidis, "Computation of the pressure inside bubbles and pores in Stokes flow", J. Fluid Mech., 474, 319-337, (2003).

To describe the evolution of the cross section of a MOF, the EPM consists of a reduction of the solution to the full free boundary problem to the solution of a set of ordinary differential equations. It is suited to MOFs with a large number of channels and, for a wide class of geometries, it advantageously obviates the need for full numerical simulations; this has been extensively confirmed by direct comparison of the EPM predictions against the results of such simulations.

In the elliptical pore model, the basic idea is to resolve the evolution of each "pore" (representing the cross section of a channel) under the assumption that it remains elliptical as it evolves in a local linear flow induced by all the other pores. In the "far-field" of each pore all other pores are modelled as a point stresslet and point source/sink combination situated at its geometrical centroid. The outer boundary is assumed to remain circular as it evolves under the influence of the contained distribution of point singularities.

In the EPM, each channel is described mathematically by a time-evolving conformal map from the interior of the unit disc $|\zeta|=1$. Each such mapping has the form $$z_n(\zeta, \tau) = \mathcal{Z}_n(\tau) + \frac{\alpha_n(\tau)}{\zeta} + \beta_n(\tau)\zeta, \qquad (1)$$

where $\tau$ is the time variable, $Z_n$ is the centroid position and the parameters $\alpha_n(\tau) \in \mathbb{R}$ and $\beta_n(\tau) \in \mathbb{C}$ encode the orientation, area, and eccentricity of the elliptical hole (it may be shown, for example by substituting $\zeta=e^{i\varphi}$ into (1), that the unit $\zeta$-circle is transplanted under this mapping to the boundary of an ellipse). The parameter $\alpha_n(\tau)$ can be taken, by the freedoms of the Riemann mapping theorem, to be real without loss of generality.

However, there remains a need to improve the far-field approximation of the effect of each pore on the others. The possibility of a higher-order generalization of the EPM, referred to as a generalized pore model or GPM in the sequel, was discussed and explored at the same time as the EPM was proposed in the original paper by Crowdy (2004).

In this document, the terms "preform geometry" and "fiber geometry" refer to the size of the preform and fiber, respectively, as well as the locations, sizes, and shapes of the channels in the cross-section. The term "drawing process parameters", or, more simply, "draw parameters", refers to the parameters associated with the fiber drawing process. Examples of such parameters are (1) the "feed speed", the speed at which the preform is fed into the heated zone, (2) the "draw speed", the speed at which the fiber is wound around the drum, (3) the "draw tension", the force used to draw the fiber around the drum, and (4) the pressures applied to the air inside the channels. The draw parameters may also include properties of the preform being used, such as its diameter and the surface tension coefficient for that material. Depending on the situation, some parameters may be specified while others may need to be calculated.

SUMMARY

Given a fiber geometry that possesses desired optical properties, a preform geometry is determined. The desired geometry may contain a large number of channels. The processor determines the preform geometry by tracking backwards in time the parameters of a set of conformal mappings that describe the cross section of the fiber. Some of the drawing process parameters may be specified, while other parameters may be determined along with the preform geometry. The determined preform geometry may be used to fabricate the required preform. Using this preform, the determined drawing process parameters may be used to draw the desired fiber.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a diagrammatic representation of the system for fabricating optical fibers;

FIG. 2 is an example of a cross-section through a fiber preform;

FIG. 3 is an example of a cross-section through a drawn fiber;

FIG. 7 is a diagrammatic representation of a geometry produced from a higher order generalized pore model (GPM) in accordance with embodiments of the present disclosure;

FIGS. 8A and 8B show initial preform configurations for different numbers of channels in accordance with embodiments of the present disclosure.

FIGS. 10A, B, C and D show an exemplary time evolution of a preform with five square channels, in accordance with embodiments of the present disclosure. Solid lines show the channels in the fiber calculated according to a higher order generalized pore model (GPM), while superimposed dashed lines show the predictions from a full numerical solution. The right hand column shows close up views at the initial and final times in FIGS. 10B and 10D;

FIG. 9A represents the preform geometry, while the lower plots

DETAILED DESCRIPTION

Figure 4:
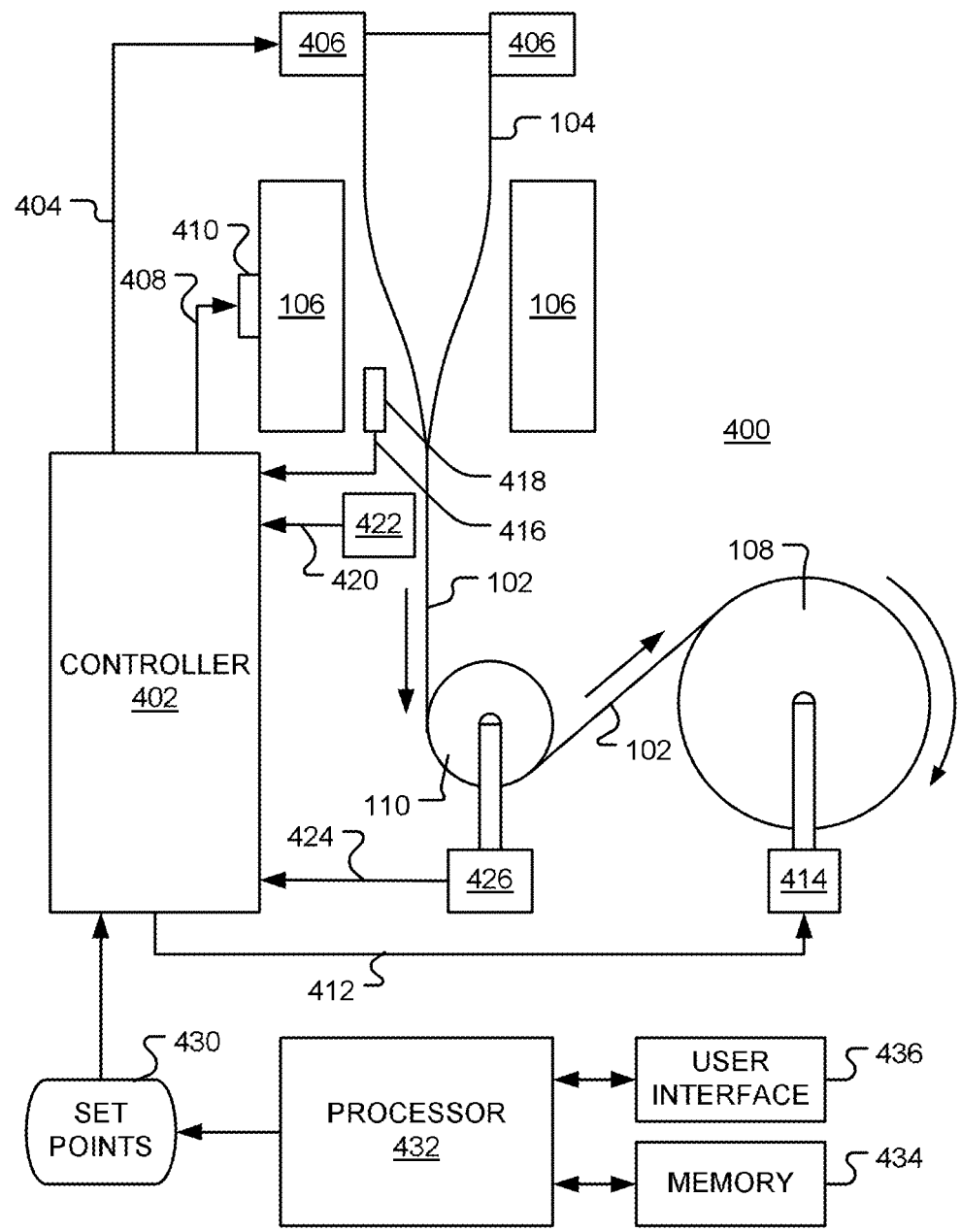
FIG. 4 is a diagrammatic representation of the system for fabricating optical fibers in accordance with embodiments of the present disclosure.

A microstructured optical fiber may be fabricated by feeding a preform into a furnace at a feed speed to heat and soften the preform material, drawing the microstructured optical fiber from heated material. The present disclosure relates to a model that can be used to determine the preform geometry that will yield the desired fiber geometry. In addition, some of the draw parameters may be specified, and other draw parameters determined so that the preform may be drawn into the desired fiber. For example, the required draw tension may be determined; it may be controlled, for example, by automatically controlling the temperature of the furnace to affect the viscosity of the preform material.

In one embodiment, the preform geometry and drawing process parameters are automatically determined in a hardware processor dependent upon the geometry of the microstructured optical fiber to be fabricated. A preform is fabricated having the determined geometry. The microstructured optical fiber is drawn from the preform by entering the drawing process parameters into a drawing system control unit that controls the fibre drawing apparatus.

Determining the preform geometry and drawing process parameters is enabled through use of an improved description of the draw process, which consists of the GPM coupled with a description of the axial flow, as described in detail below.

FIG. 1 is a diagrammatic representation of system 100 for fabricating an optical fiber 102. The optical fiber 102 is fabricated by a process known as 'fiber drawing'. A fiber preform 104, which may be a cylinder made of glass, polymer or other material, is fed into a furnace 106. In some embodiments, the preform may have a diameter in the range 1-3 centimeters and a length in the tens of centimeters. Other preform shapes and sizes may be used. The preform 104 is heated in the furnace 106 and the diameter is reduced by pulling from below—sometimes to around 100 μm. Outside of the furnace 106, the fiber 102 solidifies and is wound onto a rotating drum or spool 108; the pulling force depends on the speed at which the drum is rotated. A guide 110 may be used to guide the optical fiber 102 onto the rotating drum or spool 108. The guide 110 may be fitted with a tension measuring device.

In the case of microstructured optical fibers (MOF's), the preform 104 is fabricated with a complex geometry in its cross section. The preform 104 is fed into the furnace 106, where the material is heated and softens, and the diameter decreases to less than a millimeter, often to around 100 μm, by pulling the heated preform from below. Again, the pulling force is due to winding the resulting fiber around a rotating drum 108. This allows kilometers of fiber to be produced. MOFs inherit their cross sections from the preform, but with differences due, for example, to the effects of surface tension and pressure.

The preforms 104 themselves may be fabricated by several methods, including: (1) drilling, in which a pattern of holes is drilled into a solid billet; (2) extrusion, in which the preform is made by forcing a heated billet through a die; and (3) the "stack-and-draw" method, in which narrow tubes and rods are placed inside a large tube, which is then drawn into a preform by a method similar to fiber drawing. More information can be found in the textbook *"Foundations of Photonic Crystal Fibres"*, 2nd Edition, published by Imperial College Press.

Sectional views through the cross-sections 2-2 and 3-3 are shown in FIGS. 2 and 3, discussed below.

FIG. 2 is an example of a cross-section through a fiber preform 104 for a microstructured optical fiber (MOF). The section is shown as 2-2 in FIG. 1. The preform has an outer boundary 202 and includes a number of pores 204. The pores 204 are holes or channels fabricated as discussed above. The preform 104 has a circular cross-section, but the pores 204 may have any shape.

FIG. 3 is an example of a cross-section through a drawn fiber 102 for a microstructured optical fiber (MOF). The section is shown as 3-3 in FIG. 1. The outer boundary 302 and the pores 304 derive from the corresponding surface 202 and pores 204 of the preform. However, the shape and size of the outer surface 302 and the pores 304 is altered during the draw process. The alteration is dependent upon a number of factors, including the draw speed, furnace temperature, and channel or pore pressures.

In accordance with the present disclosure, a method is presented for determining the geometry of the preform and the process parameters for drawing the fiber.

FIG. 4 is a diagrammatic representation of system 400 for fabricating optical fibers in accordance with some embodiments of the present disclosure. Referring to FIG. 4, the system 400 includes a system controller 402 that is configured to control the fiber drawing apparatus. The fiber drawing apparatus includes a furnace 106 for heating a preform 104, a spool or rotating drum 108 to collect the fiber 102 and a guide 110 that guides the fiber onto the spool 108. The outputs from the system controller 402 include output 404 to preform feed mechanism 406, which controls the feed speed of the preform, an output 408 to furnace temperature adjuster 410 and an output 412 to spool speed controller 414, which controls the draw speed of the fiber 102. The fiber tension is dependent, at least, upon the furnace temperature (which affects viscosity), the draw speed, and the channel or pore pressures.

The system controller 402 may operate in an open-loop manner. Alternatively the system, controller may operate in a closed-loop manner. In closed-loop operation, the system controller 402 is responsive to one or more inputs that may include, for example, input 416 from furnace temperature probe 418, input 420 from fiber thickness sensor 422, fiber tension input 424 from tension sensor 426. In the embodiment shown, the tension sensor 426 is coupled to the guide 110, but tension sensors at other locations may be used, such as coupled to the spool 414 for example.

The system controller 402 is responsive to controller set points 430. The set points comprise target or desired values of the monitored inputs. For example, the set points may include a desired furnace temperature, desired draw and feed speeds (or a ratio of the draw speed to the feed speed, for example), desired draw tension, desired channel or pore pressures, and desired fiber thickness.

The set points are determined by a processor 432 that is operatively coupled to memory 434 and user interface 436. The memory 434 may contain computer instructions that, when executed by the processor, automatically generate the set points from user inputs.

Optionally, the input 420 from fiber thickness sensor 422 may be supplied to the processor 432 to enable the set points 430 to be updated by the processor 432. This allows system modeling errors to be compensated for by comparing the sensed fiber thickness to the desired fiber thickness.

In one embodiment, the user input comprises the desired geometry of the fiber to be fabricated. Optionally, the user input may also consist of one or more of the draw parameters. From these user inputs, the processor determines the required preform geometry and the set points for the system controller.

In accordance with an aspect of the present disclosure, a multichannel microstructured optical fiber is modeled by the geometric pore model (GPM) coupled to an axial flow model, as described below. The model is implemented by the processor 432. An advantage of this approach is that preform geometries may be predicted for a class of complex fiber geometries for which this was not possible with previous models. In this approach, the desired fiber properties are provided as inputs and the geometry of a preform is provided as output. In one embodiment, one or more draw parameters may be specified, and other draw parameters are determined such that the fiber produced by the draw process has the desired geometry.

The model implemented by the processor consists of the GPM and a description of the axial flow. The GPM models the evolution of the cross-plane geometry and allows the preform geometry to be determined from the fiber geometry. Coupling with the axial flow then allows the required draw parameters to be calculated. In the approach described here, the GPM is distinguished from prior cross-plane models in that each channel is described using an arbitrary number of terms in the series given in equation (2). The description of the axial flow given here is distinguished from prior descriptions in that it includes pressure.

Figure 5:
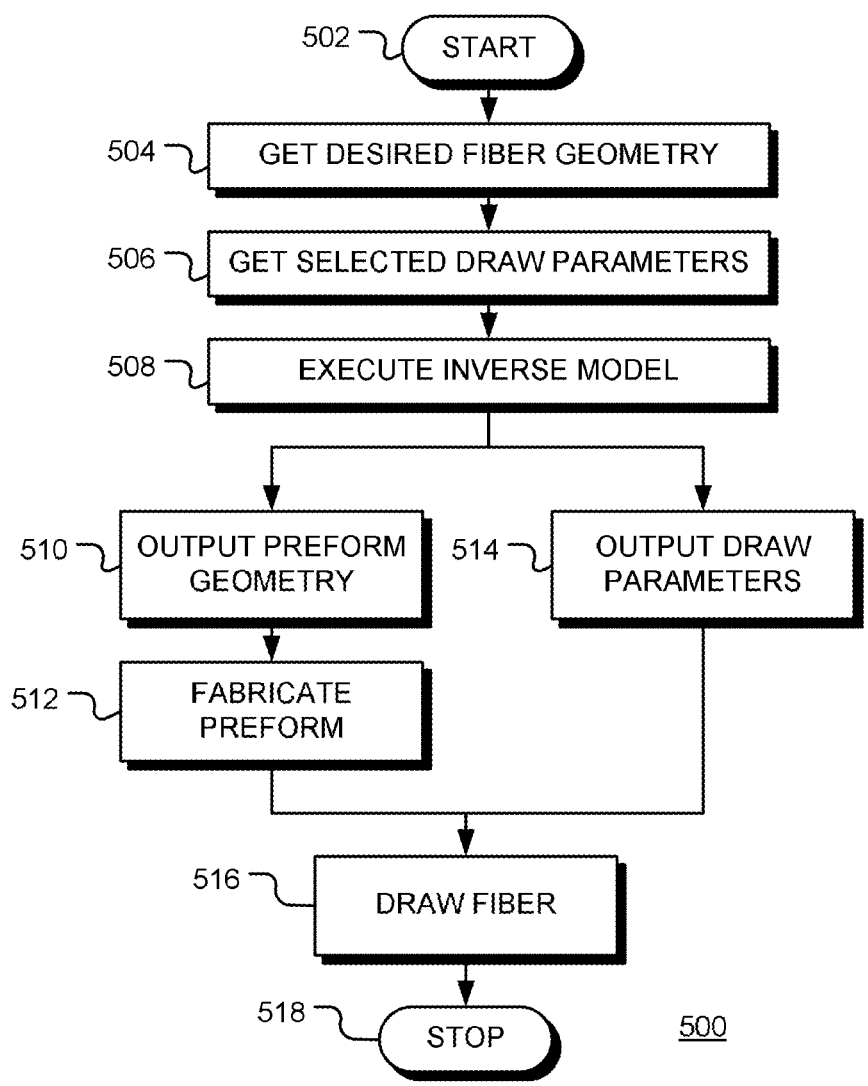
FIG. 5 is a flow chart of a method for controlling fabrication of an optical fiber in accordance with embodiments of the present disclosure.

FIG. 5 is a flow chart 500 of a method for controlling fabrication of an optical fiber. Following start block 502 in FIG. 5, a processor retrieves, at block 504, one or more parameters that describe desired geometry of an optical fiber to be fabricated. At block 506 the process retrieves parameters that describe the fabrication process. The fiber geometry and draw parameters may be entered by a user via a user interface coupled to the processor, for example. At block 508 the processor executes an inverse model to determine draw parameters that enable fabrication of a fiber with the desired properties. At block 510 parameters describing the preform configuration are output and are used at block 512 to fabricate a preform. At block 514 the process or draw parameters are output as controller set point parameters. These may include, for example, a desired draw ratio and fiber tension. At block 516, the controller set point parameters are used in a system controller to control the fabrication process in which the fiber is drawn from the preform. For example, the controller may control the ratio of the fiber draw speed to the preform feed speed dependent upon the set point corresponding to the draw ratio. The process terminates at block 518. The controller set points may be output directly to the controller or saved and input to the controller at a later time.

Higher Order Geometric Pore Model

In the Geometric Pore Model (GPM), the mapping describing each channel is extended to included terms up to $\zeta^{N-1}$, where the integer N is referred to as the "order" of the GPM. The case N=2 corresponds to the EPM given in equation (1) above. The GPM is described in more detail below.

Figure 6:
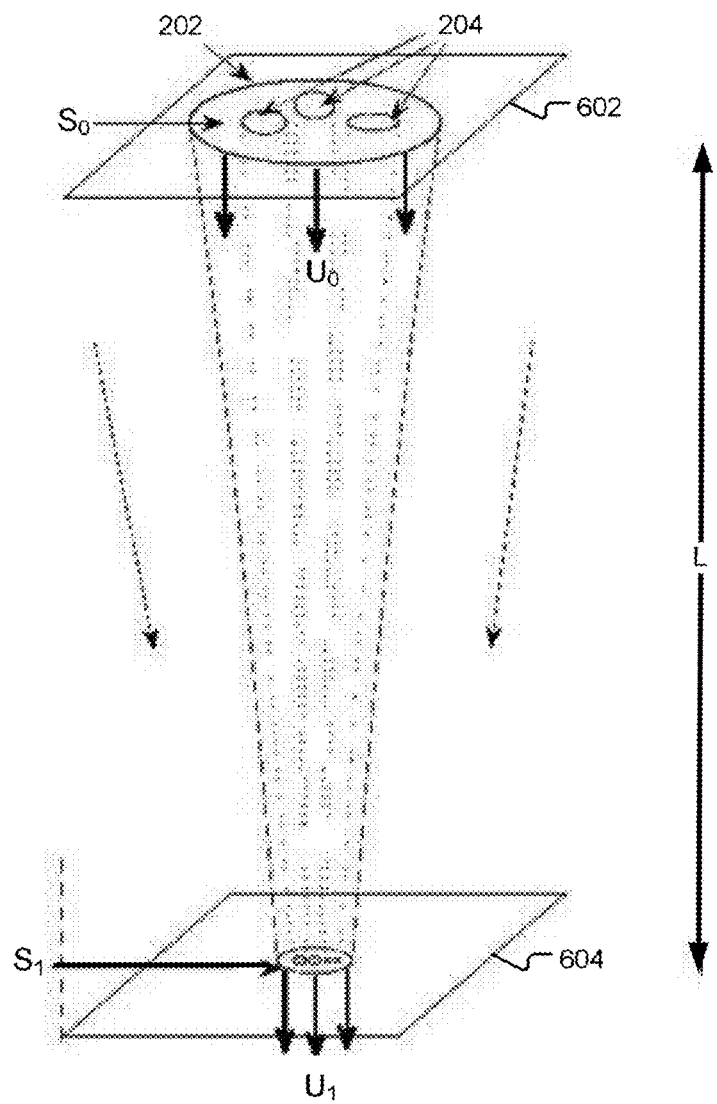
FIG. 6 is a schematic of the drawing of a multi-channel microstructured optical fiber (MOF) in accordance with embodiments of the present disclosure.
Figure 9A:
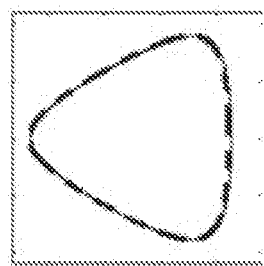
FIGS. 9A, B, C, D and E show close-up cross-sections of a channel in the fibers drawn from preforms of the type shown in FIGS. 8A and 8B, with FIG. 9A 3, FIG. 9B 4, 9C 5, FIG. 9D 6, and FIG. 9E 7 channels. Solid lines show the evolution according to a higher order generalized pore model (GPM) of the present disclosure, while superimposed dashed lines show predictions from a full numerical solution, in accordance with embodiments of the present disclosure.
Figure 9B:
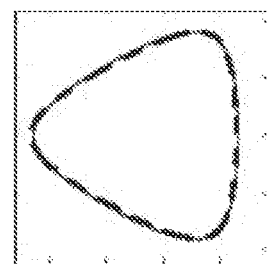
FIGS. 9B, 9C, and 9D represent possible fiber geometries, in accordance with embodiments of the present disclosure.
Figure 9C:
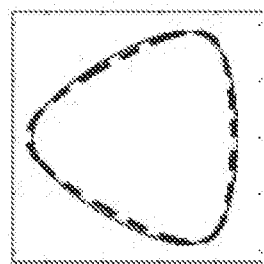
Figure 9D:
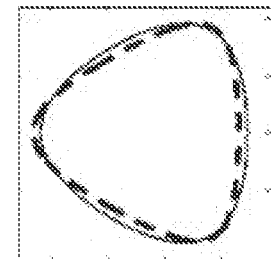
Figure 9E:
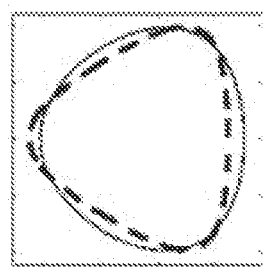

FIG. 6 is a schematic of the drawing of a multi-channel microstructured optical fiber (MOF) undergoing deformation from preform to fiber. A preform with cross-sectional area $S_0$ and outer boundary 202 containing multiple channels or pores 204 is fed into a hot-zone 602 at speed $U_0$ and pulled down at a draw speed $U_1$ to a cross-sectional area $S_1$ over a "neck-down length" L to cool zone 604. During the draw, the channel shapes deform owing to a combination of surface tension and draw tension. It is these shape deformations that are modeled by the higher order geometric pore model (GPM) presented below.

FIG. 7 is a diagrammatic representation of a GPM with N=3, which includes close-to-triangular pores. A typical pore sits in a local $N^{th}$ order strain, of the type given in equation (6) below, produced by the outer boundary and the effects of all other pores which are modelled as point stresslets and sources/sinks. Each pore is described by a mapping of the form given in equation (2) below.

The higher order geometric pore models (GPM's) disclosed here extend the elliptical pore model (EPM) to include higher order terms parameterized by an integer N>2, capable of capturing the shape deformations of broader classes of fiber geometries. The elliptical pore model constituted the N=2 case; the N=3 model can describe the evolution of MOFs whose structure of channels exhibit triangle-like shapes, the N=4 model captures the evolution of quadrangular channels, etc.

Higher order geometric pore models offer the advantage of reducing the description of the cross-plane evolution of a collection of pores to finding the solution of an approximating finite system of nonlinear ordinary differential equations. The models offer a fast simulation of the evolution of a given geometry and also offer a regularization of the inverse problem of finding a suitable preform geometry which, at the end of the fabrication process, will produce the desired fiber geometry.

According to the higher-order geometric pore models (GPM's) presented here, a pore with index n is modeled as having a time varying boundary $z_n(\zeta,\tau)$ that is a conformal mapping of a unit disc $|\zeta|<1$, where $\zeta$ is complex, the conformal mapping being given by:

$$z_n(\zeta, \tau) = \mathcal{Z}_n(\tau) + \frac{a_{n,-1}(\tau)}{\zeta} + \sum_{k=1}^{N-1} a_{n,k}(\tau)\zeta^k. \tag{2}$$

where $\tau$ is the time variable, $Z_n$ is the centroid position and the parameters $a_{n,-1}(\tau) \in \mathbb{R}$ and $a_{n,k}(\tau) \in \mathbb{C}$ encode the orientation, area, and eccentricity of the elliptical hole. The parameter $a_{n,-1}(\tau)$ can be taken, by the freedoms of the Riemann mapping theorem, to be real without loss of generality. In equation (2), $\text{Re}\{z_n(\zeta,\tau)\} \equiv x_n(\zeta,\tau)$ denotes the x-coordinate of the pore boundary and $\text{Im}\{z_n(\zeta,\tau)\} \equiv y_n(\zeta,\tau)$ denotes the y-coordinate of the pore boundary.

In the special case where the mapping has the form $$z(\zeta, \tau) = \mathcal{Z}(\tau) + \frac{a}{\zeta} + b\zeta^{N-1} \tag{3}$$

then the resulting image of $|\zeta|=1$ under such a map is known as a hypotrochoid. The generalized class of mappings (2) allows modelling of both the forward and inverse problem for the fabrication of MOFs whose channels are clearly not of near-elliptical shape, but which may have a more triangular or quadrangular symmetry for example. It is clear that, for N>2, the increase in the number of parameters in equation (2), compared to equation (1), enables wider classes of shapes to be described.

A Goursat representation for the bi-harmonic stream function is used, namely $$\psi = \text{Im}[\bar{z}f(z,\tau) + g(z,\tau)], \tag{4}$$

where the velocity components (u, v) are given by $$u = \frac{\partial \psi}{\partial y}, v = -\frac{\partial \psi}{\partial x}. \tag{5}$$

For a given N≥2, the mathematical result on which the GPM is predicated is the fact that a compressible pore described by the conformal mapping is known to remain describable by this same functional form—but with time-varying parameters—if situated in a nonlinear flow with far-field conditions $$f(z) \sim f_1 z + O(1/z), \quad g'(z) = \sum_{k=1}^{N-1} g_k z^k + O(1/z), \tag{6}$$

as $z \to \infty$ (i.e., $\zeta \to 0$). Here $f_1$ is related to the far-field pressure p and vorticity $\omega$, as follows from the relation $$4f'(z, \tau) = \frac{p}{\mu} - i\omega. \tag{7}$$

The set of (possibly time-varying) parameters $\{g_k\}$ parametrize some far-field straining flow (which is nonlinear if any of $g_2, \ldots g_{N-1}$ are non-zero).

The shape evolution of the pore is therefore fully captured by the dynamical evolution of just the finite set of parameters: $Z_n(\tau)$, $a_{n,-1}(\tau)$ and $a_{n,k}(\tau)$.

On comparison with the development, the EPM corresponds to the special case N=2, and the GPMs presented next generalize the EPM to other shape possibilities. The basic idea of the model is the evolution of the n-pore as determined by the "local" far-field flow it sees, due to the presence of the outer boundary and the other pores, under the approximation that the outer boundary remains exactly circular while all other pores are modelled as point stresslet and sink combinations.

There is no systematic asymptotic analysis of this system in a small parameter (essentially, the ratio of a typical pore dimension to the typical pore separation) but rather reliance on intuitive asymptotic notions of a separated "inner" and "outer" length scale to build the model. Indeed, such an asymptotic analysis will lead to a different system to that derived here. This is because the conditions in (6) describe a rotational, generally nonlinear, strain in the far-field, but one with uniform vorticity in the far-field, given by $w_\infty$.

However, it should be noted that we have excluded the possibility of f(z) having any singularity at infinity that is stronger than the simple pole manifested in equation (6). Strictly speaking, in any rational asymptotic procedure, it would be necessary to retain such higher singularities in f(z) if they are allowed for g'(z). It is noted that the assumed far-field asymptotic behaviors of the functions f(z) and g'(z) have different forms. In contrast the fluid velocity is expressed as $$u+iv = -f(z,\tau) + z\overline{f'(z,\tau)} + \overline{g'(z,\tau)} \tag{8}$$

The reason for the choice (6) is that it is only in this class of far-field nonlinear flows that the exact solution structure (on which our model is based) pertains. These matters of which far-field flows give rise to exact solutions are explored in detail in D. G. Crowdy & M. Siegel, "*Exact solutions for the evolution of a bubble in Stokes flow: a Cauchy transform approach*", SIAM J. Appl. Math., 65, 941-963, (2005); where a Cauchy transform approach to the matter of deriving those solutions is developed. While the assumption of the far-field forms (6) are not asymptotically self-consistent, the inventors have empirically tested the validity of this assumption by extensive comparison of the resulting models against a suite of full numerical simulations. The accuracy of the models presented here has been found to be excellent in a broad array of physically relevant geometries.

Exact Solution Structure

A description is now given of a single channel in an ambient flow where the Goursat functions have the far-field form (6). For now, the conformal mapping to the fluid region exterior to the single pore will therefore be taken as $$z(\zeta, \tau) = \mathscr{Z} + \frac{a_{-1}}{\zeta} + \sum_{k=1}^{N-1} a_k \zeta^k, \tag{9}$$

where the dependence of all the parameters on time ti is also suppressed in our notation. The dynamic and kinematic boundary conditions for a bubble in Stokes flow are well known (see, for example, P. Buchak & D. G. Crowdy, *Surface-tension-driven Stokes flow: a numerical method based on conformal geometry*, under review):

$$-pn_i + 2\mu\epsilon_{ij}n_j = -\gamma\kappa n_i - p_B n_i, \tag{10}$$

$$\frac{d\vec{x}}{dr} \cdot \vec{n} = \vec{u} \cdot \vec{n}.$$

Here, $p_B$ is the pressure imposed on the boundary, which can be either the outside of the fiber or the inside of a channel. The stresslet strength $\lambda$ is the complex parameter such that $$f(z, \tau) \sim f_1 z + \frac{\lambda}{2\pi z} + \ldots \tag{12}$$

as $z \to \infty$.

On substitution of (9) into the kinematic boundary condition, and on equating coefficients of z and 1/z, we find, for the evolution of the real $a_{-1}$ parameter for each channel and the relation between the stresslet strength $\lambda$ for that channel and its shape parameters, $$\dot{a}_{-1} = -a_{-1} I(0, \tau) - \frac{1}{2} a_{-1}(p_\infty - p_B), \tag{13}$$

$$\frac{\lambda}{\pi} = \dot{a}_{-1} a_1 - a_{-1} \dot{a}_1 + i a_{-1} a_1 \omega_\infty + 2 a_{-1} a_1 I(0, \tau) - \frac{1}{2} a_{-1}^2 I''(0, \tau)$$

where superposed dots denote derivatives with respect to r and $I'(\zeta,r) = \partial I/\partial \zeta$. We have also used the fact that $$4f_1 = p_\infty - i w_\infty, \tag{14}$$

where $p_\infty$ and $w_\infty$ denote the far-field pressure and vorticity respectively (and where we are suppressing their dependence on $\tau$, for brevity). Furthermore, by the incompressibility of the fluid, the parameter m is the rate of change of the area A of the channel. On use of (2), Stokes' theorem and the residue theorem we find $$\mathscr{A} = \pi\left(|a_{-1}|^2 - \sum_{k=1}^{N-1} k|a_k|^2\right).$$

Hence the relation between the parameter associated with each pore and its shape parameters is $$\frac{m}{\pi} = \frac{d}{d\tau}\left(|a_{-1}|^2 - \sum_{k=1}^{N-1} |a_k|^2\right). \tag{15}$$

Equations (13) and (15) give expressions for the pore's effective values of m and $\lambda$ in terms of its shape parameters (and their time derivatives), as well as a single ODE for the evolution of its associated $a_{-1}$ coefficient. However it remains to determine ODEs for the pore's other coefficients (i.e., $a_1, a_2, \ldots$). These are obtained by substitution into the dynamic boundary condition, or, more easily, by following a general procedure described by Crowdy & Siegel (D. G. Crowdy & M. Siegel, *"Exact solutions for the evolution of a bubble in Stokes flow: a Cauchy transform approach"*, SIAM J. Appl. Math., 65, 941-963, (2005)) based on a Cauchy transform approach to the free boundary problem.

The Crowdy & Siegel paper referenced above, incorporated herein by reference, includes an explanation as to why conformal mappings of the form (9) are dynamically preserved by the system.

Below are the results for the cases N=3 and N=4; the analysis for higher values of N follow analogously.

Example Solution: Case N=3 (Triangular Pore)

For the N=3 case, the function C(z) is found to be $$C(z,\tau) = a_{-1}^{-1}\overline{a_1}z + a_{-1}^{-2}\overline{a_2}z^2 + \text{const.} \tag{16}$$

The required equations, which can be obtained by balancing the singularities as $z \to \infty$, are found to be $$\overline{\dot{a}_1} = \alpha_{-1}^{-1}\dot{\alpha}_{-1}\overline{a_1} + 4f_1\overline{a_1} + 2\alpha_{-1}g_1,$$

$$\overline{\dot{a}_2} = 2\alpha_{-1}^{-1}\dot{\alpha}_{-1}\overline{a_2} + 6f_1\overline{a_2} + 2\alpha_{-1}^2 g_2, \tag{17}$$

Substituting for $a_{-1}$ from (13) in the above two equations, taking complex conjugates, making use of (14), and collecting the system together, we arrive at $$\dot{\alpha}_{-1} = -\alpha_{-1}I(0,\tau) - \tfrac{1}{2}\alpha_{-1}(p_\infty - p_B),$$

$$\dot{a}_1 = -a_1 I(0,\tau) + \tfrac{1}{2}a_1(p_\infty - p_B) + 2\overline{g_1\alpha_{-1}} + i\omega_\infty a_1,$$

$$\dot{a}_2 = -2a_2 I(0,\tau) + \tfrac{1}{2}a_2(p_\infty - p_B) + 2\overline{g_2\alpha_{-1}^2} + \tfrac{3}{2}i\omega_\infty a_1, \tag{18}$$

Example Solution: Case N=4 (Rectangular Pore)

For the N=4 case, the same procedures lead to $$C(z,\tau) = (\alpha_{-1}^{-1}\overline{a_1} - 3\alpha_{-1}^{-2}a_1\overline{a_3})z + \alpha_{-1}^{-2}\overline{a_2}z^2 + \alpha_{-1}^{-3}\overline{a_3}z^3, \tag{19}$$

together with the ODE system $$\overline{\dot{a}_1} = a_{-1}^{-1}\dot{a}_{-1}\overline{a_1} - 6a_{-1}^{-2}\dot{a}_{-1}a_1\overline{a_3} + 3a_{-1}^{-1}\dot{a}_1\overline{a_3} + 3a_{-1}^{-1}a_1\dot{\overline{a}}_3 + \tag{20}$$
$$4f_1\overline{a_1} - 12f_1a_{-1}^{-1}a_1\overline{a_3} + 4f_{-1}a_{-1}^{-2}\overline{a_3} + 2a_{-1}g_1\},$$

$$\overline{\dot{a}_2} = 2a_{-1}^{-1}\dot{a}_{-1}\overline{a_2} + 6f_1\overline{a_2} + 2a_{-1}^2 g_2,$$

$$\overline{\dot{a}_3} = 3a_{-1}^{-1}\dot{a}_{-1}\overline{a_3} + 8f_1\overline{a_3} + 2a_{-1}^3 g_3.$$

which, again, are to be supplemented with (13) for $a_{-1}$, i.e., $$\dot{\alpha}_{-1} = -\alpha_{-1}I(0,\tau) - \tfrac{1}{2}\alpha_{-1}(p_\infty - p_B), \tag{21}$$

In this way it should be clear how to generate a hierarchy of GPM models for any N>2.

Model for Global Flow

Each channel is modeled as the combination of a source of strength $m_n(\tau)$ and a stresslet of strength $\lambda_n(\tau)$, with $m_n$ real and $\lambda_n$ complex. The global flow is described by f(z) and g'(z) having the form $$f(z,\tau) = \underbrace{\sum_{n=1}^{M}\frac{\lambda_n(\tau)}{2\pi(z-\mathcal{Z}_n(\tau))}}_{\text{stresslet term}} + \underbrace{\tfrac{1}{4}P(\tau)z}_{\text{outer boundary effect}}, \tag{22}$$

$$g'(z,\tau) = \underbrace{\sum_{n=1}^{M}\frac{m_n(\tau)}{2\pi(z-\mathcal{Z}_n(\tau))}}_{\text{source/sink term}} + \underbrace{\sum_{n=1}^{M}\frac{\lambda_n(\tau)\overline{\mathcal{Z}_n(\tau)}}{2\pi(z-\mathcal{Z}_n(\tau))^2}}_{\text{stresslet term}},$$

where $P(\tau)$ is understood as a bulk pressure term through which the effect of the outer boundary is felt by the internal channels. The outer boundary is assumed to be a circle whose radius varies in time, $$|z| = R(\tau),$$

The balance of forces, and the kinematic condition, on the outer boundary yield equations:

$$P(\tau) - p_B^{(0)} + \frac{\mathcal{M}}{\pi R^2} = \frac{1}{R}\frac{dR}{d\tau} = \frac{\mathcal{M}}{2\pi R}, \quad \mathcal{M} = \sum_{n=1}^{M} m_n \tag{23}$$

where M is the total source/sink strength of the ensemble of pores. Consistency with a purely circular outer boundary requires $$\sum_{n=1}^{M}\lambda_n = 0.$$

While the global outer flow is approximated as (22), the evolution of the $n^{th}$ channel is governed by how that flow looks close to $\mathcal{Z}_n$. A local Taylor expansion of (22) about $\mathcal{Z}_n$ produces $$f(z,\tau) = \left(\tfrac{1}{4}P\mathcal{Z}_n + \sum_{j\neq n}\frac{\lambda_j}{2\pi(\mathcal{Z}_n - \mathcal{Z}_j)}\right) + \tag{24}$$
$$\left(\tfrac{1}{4}P - \sum_{j\neq n}\frac{\lambda_j}{2\pi(\mathcal{Z}_n - \mathcal{Z}_j)^2}\right)(z - \mathcal{Z}_n) +$$
$$\left(\sum_{j\neq n}\frac{\lambda_j}{2\pi(\mathcal{Z}_n - \mathcal{Z}_j)^3}\right)(z - \mathcal{Z}_n)^2 + \ldots$$

$$g'(z,\tau) = \left(\sum_{j\neq n}\frac{m_j}{2\pi(\mathcal{Z}_n - \mathcal{Z}_j)} + \sum_{j\neq n}\frac{\lambda_j\overline{\mathcal{Z}_j}}{2\pi(\mathcal{Z}_n - \mathcal{Z}_j)^2}\right) +$$
$$\left(-\sum_{j\neq n}\frac{m_j}{2\pi(\mathcal{Z}_n - \mathcal{Z}_j)^2} - \sum_{j\neq n}\frac{\lambda_j\overline{\mathcal{Z}_j}}{\pi(\mathcal{Z}_n - \mathcal{Z}_j)^3}\right)(z - \mathcal{Z}_n) +$$
$$\left(\sum_{j\neq n}\frac{m_j}{\pi(\mathcal{Z}_n - \mathcal{Z}_j)^3} + \sum_{j\neq n}\frac{3\lambda_j\overline{\mathcal{Z}_j}}{\pi(\mathcal{Z}_n - \mathcal{Z}_j)^4}\right)(z - \mathcal{Z}_n)^2 +$$
$$\left(-\sum_{j\neq n}\frac{3m_j}{\pi(\mathcal{Z}_n - \mathcal{Z}_j)^4} - \sum_{j\neq n}\frac{12\lambda_j\overline{\mathcal{Z}_j}}{\pi(\mathcal{Z}_n - \mathcal{Z}_j)^5}\right)(z - \mathcal{Z}_n)^3 + \ldots,$$

where the time dependence of the parameters on the right hand side has been suppressed for brevity. Note that we have included more terms in these Taylor expansions than are needed for the N=2 case considered in the EPM model. On use of (8), and on substitution of (24), the velocity of the centroid of channel n is $$\frac{d\mathcal{Z}_n}{d\tau} = -\sum_{j\neq n}\frac{\lambda_j(\overline{\mathcal{Z}_n} - \overline{\mathcal{Z}_j})}{2\pi(\mathcal{Z}_n - \mathcal{Z}_j)^2} + \sum_{j\neq n}\frac{m_j}{2\pi(\mathcal{Z}_n - \mathcal{Z}_j)} - \sum_{j\neq n}\frac{\lambda_j}{2\pi(\mathcal{Z}_n - \mathcal{Z}_j)}. \tag{25}$$

To determine the shape evolution of the $n^{th}$ channel, the coefficients in (6) (with the origin moved to $\mathcal{Z}_n$) are matched to the appropriate terms in the Taylor expansions (24). The required far-field flow, as "seen by" the $n^{th}$ pore, can then be read off and is found to be $$\tfrac{1}{4}(p_\infty^{(n)} - i\omega_\infty^{(n)}) = \tfrac{1}{4}P - \sum_{j\neq n}\frac{\lambda_j}{2\pi(\mathcal{Z}_n - \mathcal{Z}_j)^2} \tag{26}$$

$$g_1^{(n)} = -\sum_{j\neq n}\frac{m_j}{2\pi(\mathcal{Z}_n - \mathcal{Z}_j)^2} - \sum_{j\neq n}\frac{\lambda_j(\overline{\mathcal{Z}_n} - \overline{\mathcal{Z}_j})}{\pi(\mathcal{Z}_n - \mathcal{Z}_j)^3} \tag{27}$$

$$g_2^{(n)} = \sum_{j\neq n}\frac{m_j}{\pi(\mathcal{Z}_n - \mathcal{Z}_j)^3} + \sum_{j\neq n}\frac{3\lambda_j(\overline{\mathcal{Z}_n} - \overline{\mathcal{Z}_j})}{\pi(\mathcal{Z}_n - \mathcal{Z}_j)^4} \tag{28}$$

-continued $$g_3^{(n)} = -\sum_{j\neq n} \frac{3m_j}{\pi(\mathcal{Z}_n - \mathcal{Z}_j)^4} - \sum_{j\neq n} \frac{12\lambda_j(\overline{\mathcal{Z}_n - \mathcal{Z}_j})}{\pi(\mathcal{Z}_n - \mathcal{Z}_j)^5}. \quad (29)$$

It is these quantities that can now be substituted into the ODEs, such as (18) or (20), governing the evolution of the shape parameters of the $n^{th}$ pore.

Coupling with Axial Flow

To obtain the drawing process parameters, the GPM must be coupled with a description of the axial flow. Since it has become standard to use pressure during fiber drawing, each channel may be characterized by a pressure that varies along its length. The equations for this general case are given in Chen et al., *Microstructured optical fibre drawing with active channel pressurisation* (in preparation), $$Su = 1 \quad (30)$$

$$(3\mu^* Su_x)_x - \frac{1}{2}\gamma^* \Gamma_x - (p_B^{(0)})_x \mathcal{A}^{(0)} - \sum_{k=1}^{N} (p_B^{(k)})_x \mathcal{A}^{(k)} = 0$$

where S(x) and u(x) are the unknown fiber cross section and axial flow velocity, respectively, as functions of the axial coordinate x, $A^{(k)}(x)$ and $\Gamma^{(k)}(x)$ are the area and perimeter of channel k, which are calculated from the cross-plane model, and $p_B^{(k)}(x)$ is the pressure imposed on channel k. $A^{(0)}(x)$, $\Gamma^{(0)}(x)$, and $p_B^{(0)}(x)$ are the area, perimeter, and pressure for the outer boundary. When using the GPM cross-plane model, these equations should be solved simultaneously with the equations for the evolution of the channel parameters to calculate the drawing process parameters. The equations may be solved by methods that are standard in mathematics.

The pressure in each channel is assumed to be uniform along the channel's length. In this case, introduction of the variable $\chi(x)=\sqrt{S(x)}$ reduces the equations for the axial problem to $$\chi^2(\tau)u(\tau) = 1, \quad (31)$$

$$\frac{d\chi}{d\tau} - \frac{\chi}{12}\tilde{\Gamma}(\tau) = -\frac{\sigma^*}{\gamma^*},$$

where $\tau$ is a reduced time coordinate defined by $$\tau = \gamma^* \int_0^\tau \frac{d\tilde{t}}{\mu^*\sqrt{S}}, \quad (32)$$

and $\sigma^*$ and $\gamma^*$ are the dimensionless draw tension and surface tension related to the dimensional draw tension and surface tension by $$\frac{\sigma}{\gamma} = 6\sqrt{S_0}\frac{\sigma^*}{\gamma^*}. \quad (33)$$

(Stokes et al, *Drawing of micro-structured fibres: circular and non-circular tubes*, J. Fluid Mech., 2014).

In situations where all the channel or pore pressures are equal to the ambient pressure, the cross-plane problem may be solved independently of the axial problem, and the parameters calculated immediately from the cross-plane solution. In this case, the four parameters $\tau_L$, D, $\sigma^*$, and $\gamma^*$ are related by two constraints, $$\sigma^* = \frac{1}{M}\log\frac{\sqrt{D}}{H(\tau_L)}, \frac{H(\tau_L)}{\sqrt{D}} + \frac{\sigma^*}{\gamma^*}\int_0^{\tau_L} H(\tau)d\tau = 1. \quad (34)$$

Here, $\tau_L$ is the reduced time over which the cross-plane model is run, D is the draw ratio, and M=m(1), where m(x) is calculated from the axial dependence of viscosity $\mu^*(x)$ by $$m(x) = \int_0^x \frac{1}{\mu^*(x')}dx', \quad (35)$$

These two constraints allow two of the parameters to be computed when the other two are specified, once the function $H(\tau)$ is calculated from the cross-plane solution (Stokes et al, *Drawing of micro-structured fibres: circular and non-circular tubes*, J. Fluid Mech., 2014)

$$H(\tau) = \exp\left(-\frac{1}{2}\int_0^\tau \tilde{\Gamma}(\tau')d\tau'\right). \quad (36)$$

For example, if the preform and fiber geometries are known, D and $\tau_L$ will be known, allowing $H(\tau)$ to be calculated. The second constraint can then be solved for $\sigma^*/\gamma^*$. In turn, if the surface tension coefficient $\gamma$ of the material is known, the equation relating $\sigma^*/\gamma^*$ and $\sigma/\gamma$ may be solved to give $\sigma$, the tension required for the draw. This procedure does not require knowledge of the viscosity $\mu(x)$.

When at least one channel or pore pressure is different from the ambient pressure, the cross-plane and axial problems must be solved simultaneously because the cross-section $\chi(x)=\sqrt{S(x)}$ appears in the cross-plane equations. The relation between the channel or pore pressures and the pressures $p_B$ that appear in the cross-plane boundary conditions is given in Chen et al., *Microstructured optical fibre drawing with active channel pressurisation* (in preparation), $$(-\tilde{p} + 2\tilde{v}_{\tilde{y}})G_{\tilde{y}}^{(k)} + (\tilde{v}_{\tilde{z}} + \tilde{\omega}_{\tilde{y}})G_{\tilde{z}}^{(k)} = -\left(\tilde{\kappa} + \frac{p^{*(k)}}{\gamma^*}\chi\right)G_{\tilde{y}}^{(k)}, \quad (37)$$

$$(\tilde{v}_{\tilde{z}} + \tilde{\omega}_{\tilde{y}})G_{\tilde{y}}^{(k)} + (-\tilde{p} + 2\tilde{\omega}_{\tilde{z}})G_{\tilde{z}}^{(k)} = -\left(\tilde{\kappa} + \frac{p^{*(k)}}{\gamma^*}\chi\right)G_{\tilde{z}}^{(k)},$$

By comparison with the dynamic boundary condition given as the first equation in (10), $p_B$ is given by the channel or pore pressure times $\chi(x)/\gamma^*$.

Testing and Accuracy

The GPMs here have extensive scope and accuracy. To test scope and accuracy of the GPMs the predictions of the models are compared with results obtained by full numerical simulations based on a numerical scheme. For simplicity, the tests described here involve no channel pressurization.

The latter scheme is based on a conformal mapping description of the fluid domain and it calculates the time evolution of the coefficients of a conformal mapping function from a canonical domain (and that canonical domain shape itself also varies in time owing to the multiple connectivity of the domains).

Test 1:

Consider a ring of $N_c$ "triangular" channels, each described by $$z_n(\zeta)=re^{2\pi in/N_c}+s\zeta^{-1}-te^{6\pi in/N_c}\zeta^2, \tag{38}$$

The parameter r gives the distance of each channel from the center, s reflects the size of each channel, and t characterizes how "triangular" the channel is, with higher values of t generally producing sharper corners. For t>0, the triangles point inwards while, for t<0, they point outwards.

First, the number of channels $N_c$ is varied while keeping r fixed; this allowed the accuracy to be tested as the distance between the channels was varied, for a fixed distance from the outer boundary. Two initial configurations are shown in FIGS. 8A and 8B, both for r=0.5. FIG. 8A shows the initial configuration for $N_c$=3, while FIG. 8B shows the initial configuration for $N_c$=7.

FIGS. 9A-9E show close-up views of the channels after they have evolved to τ=0.05. The predictions of GPMs are shown by the solid lines, while the predictions of the full numerical solution are shown by the broken or dashed lines. In particular, FIGS. 9A-9E show evolved channels for configurations $N_c$=3 through $N_c$=7, respectively. Acceptable agreement is obtained in all cases, with the GPM giving the most accurate results when the channels are well separated, which is natural since this is when the assumptions underlying the GPM are valid.

Test 2:

An exemplary initial configuration having a ring of square channels is shown in FIG. 10A. A close-up view of an initial channel is shown in FIG. 10B. This configuration was allowed to evolve using the N=4 GPM for a time τ of 0.020 and a comparison made between the model and a full numerical solution. The evolved cross-section after elapsed time τ=0.020 is shown in FIG. 10C, while FIG. 10D shows a corresponding close-up view of an evolved channel. It is apparent that the model correctly captures the change in the location and area of the channel, as well as the slight expansion of the squares' inner sides as compared to their outer sides, while not completely capturing the deformation that occurs at the corners.

Figure 11A:
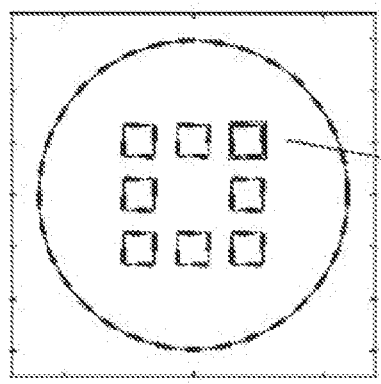
FIGS. 11 A, B, C and D show an exemplary time evolution of a preform with a grid of eight square channels, in accordance with embodiments of the present disclosure. Solid lines show the channels in the fiber calculated according to a higher order generalized pore model (GPM), while superimposed dashed lines are the full numerical solution. The right hand column shows close up views at the initial and final times.
Figure 11B:
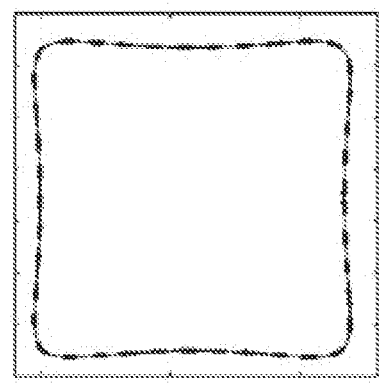
Figure 11C:
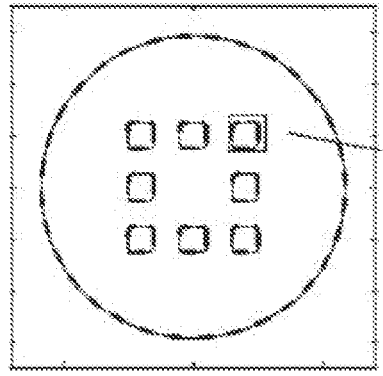
Figure 11D:
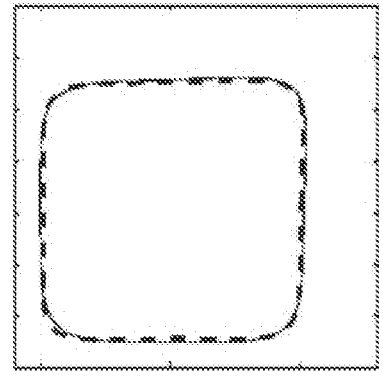

Test 3:

FIGS. 11A-11D show another configuration of squares, also allowed to evolve under the N=4 GPM and compared with a full numerical solution. The initial configuration has a ring of square channels as shown in FIG. 11A. A close-up view of an initial channel is shown in FIG. 11B. This configuration was allowed to evolve using the N=4 GPM for a time τ of 0.020 and a comparison made between the model and a full numerical solution. The evolved cross-section after elapsed time τ=0.020 is shown in FIG. 11C, while FIG. 11D shows a corresponding close-up view of an evolved channel. The agreement for this example is also very good.

EXAMPLES

Figure 12A:
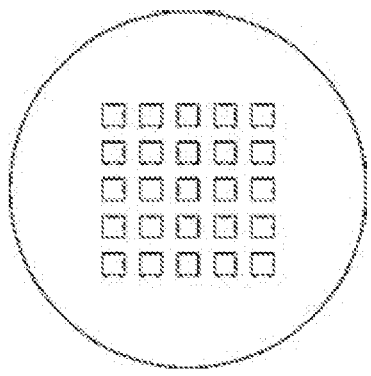
FIGS. 12 A, B, C and D show an exemplary time evolution of a grid of 25 squares with side length 0.12R arranged in a grid, with an initial separation of 0.21R between the squares' centers, where R is the initial radius of the outer boundary. The upper plot
Figure 12C:
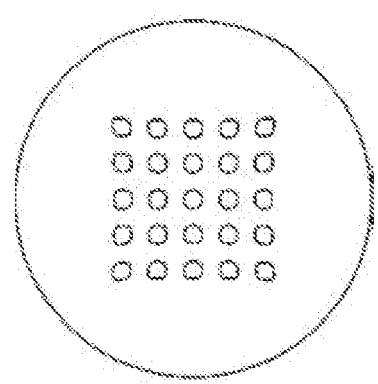
Figure 12D:
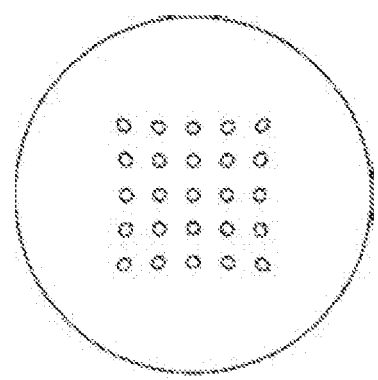
Figure 12B:
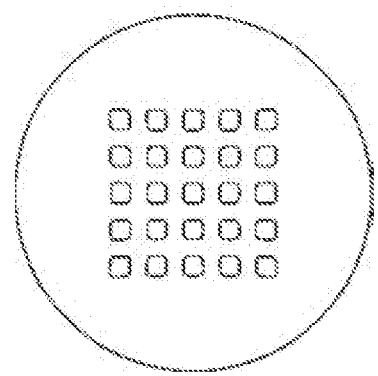

FIGS. 12A-12D show the time evolution of a grid of 25 squares with side length 0.12R arranged in a 5×5 square grid with a hollow core, with an initial separation of 0.21R between the centers of the squares; R is the radius of the outer boundary. FIG. 12A shows the initial configuration at time τ=0. FIG. 12B shows the evolved cross-section at time τ=0.010. FIG. 12C[[(c)]] shows the evolved cross-section at time τ=0.020. FIG. 12D shows the evolved cross-section at time τ=0.040.

FIGS. 10A-10D and FIGS. 12A-12D illustrate the accuracy and utility of the disclosed model compared to a full numerical solution, when used to model forward evolution through time. However, an important distinction between the disclosed model and the full numerical solution is that the disclosed model (GPM) can also be run backwards in time and so provides an inverse model. This enables the model to be used for fabricating optical fibers with selected properties. Example embodiments illustrating the use of an inverse model in optical fiber fabrication are disclosed above.

Figure 13:
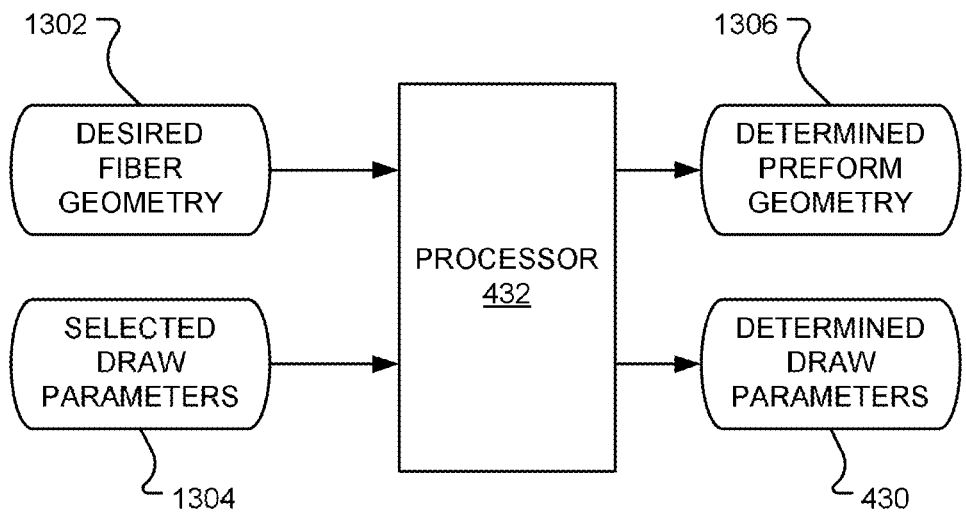
FIG. 13 is a diagrammatic representation of operation of a processor in accordance with embodiments of the present disclosure.

FIG. 13 is a diagrammatic representation of operation of a processor in accordance with embodiments of the present disclosure. The processor 432 receives, as input, the desired geometry 1302 of the fiber to be fabricated. In one embodiment, one or more selected draw parameters 1304, such as the draw ratio or the tension, are known and provide additional input. The processor executes an inverse model of the fiber draw process, and provides, as output, the preform geometry 1306 and determined draw parameters 430.

Figure 14:
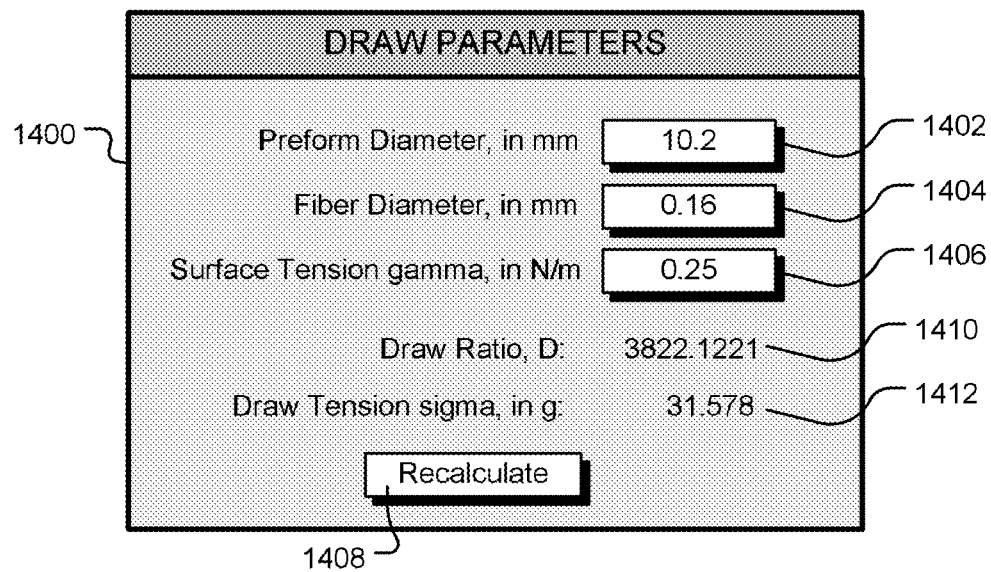
FIG. 14 shows an exemplary user interface display in accordance with embodiments of the present disclosure.

FIG. 14 shows an exemplary user interface display in accordance with embodiments of the present disclosure. In the embodiment shown in FIG. 14, the selected preform diameter is entered in edit box 1402 and the desired fiber diameter is entered in edit box 1404. The material surface tension parameter is entered in edit box 1406. Once the values are entered into the edit boxes, the 'Recalculate' button 1408 is selected to start execution of the inverse model in the processor. In this example, the resulting outputs are the draw ratio 1410 and the draw tension 1412. These output values may be used as set points for a system controller that controls the fiber fabrication process. The output values may be passed automatically to the system controller or saved in a memory coupled to the processor. Other user interface configurations and designs will be apparent to those of ordinary skill in the art. Similarly, it will be apparent that alternative choices of which parameters are to be entered as inputs and which parameters are to be calculated as outputs may be made without departing from the present disclosure.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described illustrative embodiments may be combined to create alternative embodiments not explicitly shown and described herein.

It will be appreciated that embodiments of the invention described herein may comprise one or more conventional processors and unique stored program instructions that control the one or more processors to implement, in conjunction with certain non-processor circuits, some, most, or all of the functions described herein. The non-processor circuits may include, but are not limited to, transducers, analog filters, digital filters, amplifiers, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A non-transient computer readable medium containing processor instructions that, when executed by a hardware processor, perform a method for determining fabrication parameters for a microstructured optical fiber fabrication process that draws a microstructured optical fiber from a heated preform, where the microstructured optical fiber contains a plurality of pores, the method comprising:

providing a user interface;

receiving, via the user interface, one or more user-selected properties of the microstructured optical fiber to be fabricated, where, for each pore n of the plurality of pores, the user-selected properties comprise values that specify a boundary of the pore in the fabricated microstructured optical fiber;

executing an inverse model of the fiber draw process that accounts for the outer boundary of the fiber and for interaction between pores of the plurality of pores;

determining the fabrication parameters dependent upon the one or more user-selected properties, where the one or more fabrication parameters specify a geometric configuration for the preform; and outputting the fabrication parameters for use in the microstructured optical fiber fabrication process, where executing the inverse model comprises:

representing flow in the heated preform by a stream function of the form:

$$\psi = Im[\bar{z} f(z,\tau) + g(z,\tau)],$$

in which z is a position within the fiber, $f(z) \Box f_i z + \Box (1/z)$, $$g'(z) = \sum_{k=1}^{N-1} g_k z^k + \Box(1/z)$$

and the function fi is related to the far-field pressure p and vorticity w, as follows from the relation $$4 f'(z, \tau) = \frac{p}{\mu} - i\omega;$$

for each pore of the plurality of pores, representing a time varying boundary $z_n(\zeta,\tau)$ of the pore as a conformal mapping of a unit disc $|\zeta|<1$, where $\zeta$ is a complex parameter and the conformal mapping given by:

$$z_n(\zeta, \tau) = Z_n(\tau) + \frac{a_{n,-1}(\tau)}{\zeta} + \sum_{k=1}^{N-1} a_{n,k}(\tau) \zeta^k,$$

in which $\tau$ is a time variable, n is an index of the pore, $Z_n(\tau)$ is a centroid position of the $n^{th}$ pore, $a_{n,-1}(\tau)$ and $a_{n,k}(\tau)$ are time varying parameters that describe the shape of the pore, and N is an integer greater than 2, and wherein $Re\{z_n(\zeta,\tau)\} \equiv x_n(\zeta,\tau)$ denotes the x-coordinate of the pore boundary and $Im\{z_n(\zeta,\tau)\} \equiv y_n(\zeta,\tau)$ denotes the y-coordinate of the pore boundary;

for each pore of the plurality of pores, determining first values $a_{n,-1}(\tau_0)$, $a_{n,k}(\tau_0)$ and $Z_n(\tau_0)$ from the user-selected properties of the microstructured optical fiber to be fabricated, where $\tau_0$ is a time at which the drawing process ends;

dependent upon the first values for the plurality of pores, determining, in the hardware processor, second values $a_{n,-1}(\tau_1)$, $a_{n,k}(\tau_1)$ and $Z_n(\tau_1)$ corresponding to a second value of the time variable $\tau_1$, where $\tau_1$ is a time at which the drawing process begins, and where the boundary of the $n^{th}$ pore in the preform is given by:

$$z_n(\zeta, \tau_1) = Z_n(\tau_1) + \frac{a_{n,-1}(\tau_1)}{\zeta} + \sum_{k=1}^{N-1} a_{n,k}(\tau_1) \zeta^k;$$

and outputting the fabrication parameters, where the fabrication parameters describe the boundaries $z_n(\zeta,\tau_1)$ of the pores in the preform and may be used to fabricate the preform.

2. The non-transient computer readable medium of claim 1, wherein, in the inverse model, $\tau_1 < \tau_0$ such that the $n^{th}$ pore in fabricated fiber has a boundary given by $$z_n(\zeta, \tau_0) = Z_n(\tau_0) + \frac{a_{n,-1}(\tau_0)}{\zeta} + \sum_{k=1}^{N-1} a_{n,k}(\tau_0) \zeta^k,$$

and a boundary of a corresponding pore in the preform is determined to be $$z_n(\zeta, \tau_1) = Z_n(\tau_1) + \frac{a_{n,-1}(\tau_1)}{\zeta} + \sum_{k=1}^{N-1} a_{n,k}(\tau_1)\zeta^k.$$

3. The non-transient computer readable medium of claim 1, wherein the fabrication parameters further comprise one or more draw parameters of the fiber draw process.

4. The non-transient computer readable medium of claim 1, containing further processor instruction that, when executed on the hardware processor, output system controller set points for provision to a system controller that controls the fiber draw process.

5. The non-transient computer readable medium of claim 1, wherein the fiber draw process is characterized by a set of draw parameters consisting of a first subset of draw parameters and second subset of draw parameters, and wherein the method further comprises:
  retrieving the first subset of draw parameters; and
  the hardware processor executing the inverse model to determine the second subset of draw parameters.

6. The non-transient computer readable medium of claim 1, wherein, in the inverse model, flow in the preform is characterized by a stream function of the form $$\psi = Im[\overline{z}f(z,\tau) + g(z,\tau)],$$

in which $f(z) \square_1 z + \square(1/z)$, $$g'(z) = \sum_{k=1}^{N-1} g_k z^k + \square(1/z)$$

and the function $f_1$ is related to the far-field pressure p and vorticity ω, as follows from the relation $$4f'(z, \tau) = \frac{p}{\mu} - i\omega.$$

* * * * *